(12) United States Patent
Farooqi (10) Patent No.: US 12,447,310 B2
(45) Date of Patent: Oct. 21, 2025

(54) CATHETER GUIDE AND METHOD FOR OPERATING THE SAME

(71) Applicant: Atif Hameed Farooqi, Floral Park, NY (US)

(72) Inventor: Atif Hameed Farooqi, Floral Park, NY (US)

(*) Notice: Subject to any disclaimer, the term of this patent is extended or adjusted under 35 U.S.C. 154(b) by 628 days.

(21) Appl. No.: 17/303,621

(22) Filed: Jun. 3, 2021

(65) Prior Publication Data
US 2021/0379331 A1  Dec. 9, 2021

Related U.S. Application Data

(60) Provisional application No. 63/033,909, filed on Jun. 3, 2020.

(51) Int. Cl.
| | | |
|---|---|---|
| *A61M 25/01* | (2006.01) | |
| *A61M 25/04* | (2006.01) | |
| *A61M 25/09* | (2006.01) | |
| *A61M 25/00* | (2006.01) | |

(52) U.S. Cl.
CPC ........ *A61M 25/0105* (2013.01); *A61M 25/04* (2013.01); *A61M 25/09041* (2013.01); *A61M 2025/0008* (2013.01); *A61M 2025/018* (2013.01)

(58) Field of Classification Search
CPC .............. A61M 25/0105; A61M 25/04; A61M 25/09041; A61M 25/02; A61M 25/01; A61M 2025/0008; A61M 2025/018; A61M 2025/028
See application file for complete search history.

(56) References Cited

U.S. PATENT DOCUMENTS

| | | | | |
|---|---|---|---|---|
| 2,402,306 A | * | 6/1946 | Turkel | A61M 25/02 600/573 |
| 3,920,001 A | * | 11/1975 | Edwards | A61B 5/15003 604/116 |
| 4,332,248 A | * | 6/1982 | DeVitis | A61M 5/425 604/179 |
| 2002/0062104 A1 | * | 5/2002 | Ashby | A61B 17/0057 604/93.01 |
| 2013/0102889 A1 | * | 4/2013 | Southard | C08G 61/125 600/424 |
| 2016/0121086 A1 | * | 5/2016 | Castro | A61M 25/09041 600/585 |

(Continued)

*Primary Examiner* — Bhisma Mehta
*Assistant Examiner* — Haden Matthew Ritchie
(74) *Attorney, Agent, or Firm* — DLA Piper LLP (US)

(57) ABSTRACT

Embodiments described herein are directed to an apparatus for guiding a catheter and a method of operating the same. The apparatus includes a first portion and a second portion. The first portion has a cylindrical body. The cylindrical body includes a first opening formed therethrough. The opening configured to receive a catheter. The second portion includes a body. The body includes a top surface and a bottom surface. The top surface is substantially parallel to the bottom surface. The bottom surface is configured to contact a skin of a patient. The body includes a second opening formed therethrough. The second portion is coupled with the first portion such that a forty-five degree angle is formed therebetween. The first opening and the second opening form an uninterrupted opening through the apparatus.

14 Claims, 7 Drawing Sheets

(56) References Cited

U.S. PATENT DOCUMENTS

2016/0374644 A1\* 12/2016 Mauldin, Jr. .......... A61B 8/085
600/424
2017/0245943 A1\* 8/2017 Foster .................. A61B 5/6842
2020/0230391 A1\* 7/2020 Burkholz ........... A61B 17/3403

\* cited by examiner

CATHETER GUIDE AND METHOD FOR OPERATING THE SAME

CROSS-REFERENCE TO RELATED APPLICATIONS

This application claims priority to U.S. Provisional Application No. 63/033,909, filed Jun. 3, 2020, which is hereby incorporated by reference in its entirety.

FIELD OF THE DISCLOSURE

The present disclosure generally relates to catheter guide and a method for operating the same.

BACKGROUND

Central venous catheter is a catheter that is placed into a large vein. Typically, the process involves at least one individual identifying a target location in a patient's body using various imaging techniques, such as, but not limited to, ultrasound imaging. Once the target location in the patient's body is located, the individual may guide the catheter towards the target location. This process typically involves continually monitoring the location of the catheter at various points in the patient's body. This allows the individual to ensure that the catheter is on a correct path towards the target location.

SUMMARY

In some embodiments, an apparatus is disclosed herein. The apparatus includes a first portion and a second portion. The first portion has a cylindrical body. The cylindrical body includes a first opening formed therethrough. The opening configured to receive a catheter. The second portion includes a body. The body includes a top surface and a bottom surface. The top surface is substantially parallel to the bottom surface. The bottom surface is configured to contact a skin of a patient. The body includes a second opening formed therethrough. The second portion is coupled with the first portion such that a forty-five degree angle is formed therebetween. The first opening and the second opening form an uninterrupted opening through the apparatus.

In some embodiments, an apparatus is disclosed herein. The apparatus includes a first portion and a second portion. The first portion has a cylindrical body. The cylindrical body includes a first opening formed therethrough. The opening is configured to receive a catheter. The second portion has a body. The body includes a second opening formed therethrough. The second portion is coupled with the first portion such that a forty-five degree angle is formed therebetween. The first opening and the second opening are in fluid communication.

In some embodiments, a method of inserting a catheter is disclosed herein. A user identifies a first location of a target area within a patient's body. The user identifies a second location on a surface of the patient's body based on the first location. The first location is a given depth from the second location. The user identifies a third location on the surface of the patient's body. A distance from the third location to the second location is equal to the depth from first location to the second location. The user positions an apparatus on the surface of the patient's body at the second location. The user inserts the catheter into the first opening of the apparatus. The catheter object enters the patient's body at a forty-five degree angle at the second location.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein are directed to an apparatus for guiding a catheter towards a target located within a body of a patient. As provided above, conventional approaches to placing a catheter within the body of the patient involves a "guess and check" process, by which the individual administering the catheter leverages imaging techniques throughout the process to ensure that the catheter is on a correct path towards the target. Such approach suffers from several limitations. For example, as apparent to those skilled in the art, such process, if performed by a single individual, would involve the individual to operate two different instruments simultaneously. In another example, if the process is performed by two individuals (i.e., one individual administering the catheter and a second individual operating the imaging device), two caretakers are now dedicated to the task at hand. Still further, the guess and check method is not accurate and depends on the individual choosing the correct starting point and starting path towards the target.

The one or more techniques described herein eliminate the above referenced limitations by providing an apparatus that simplifies the catheter administration process. For example, the apparatus disclosed herein provides a means for guiding the catheter towards the target and into the patient's body at a predefined angle. By defining this angle, an operator may be able to identify the insertion point on a surface of the patient's body, such that, when inserted, the catheter is already on a correct path towards the target.

Figure 1:
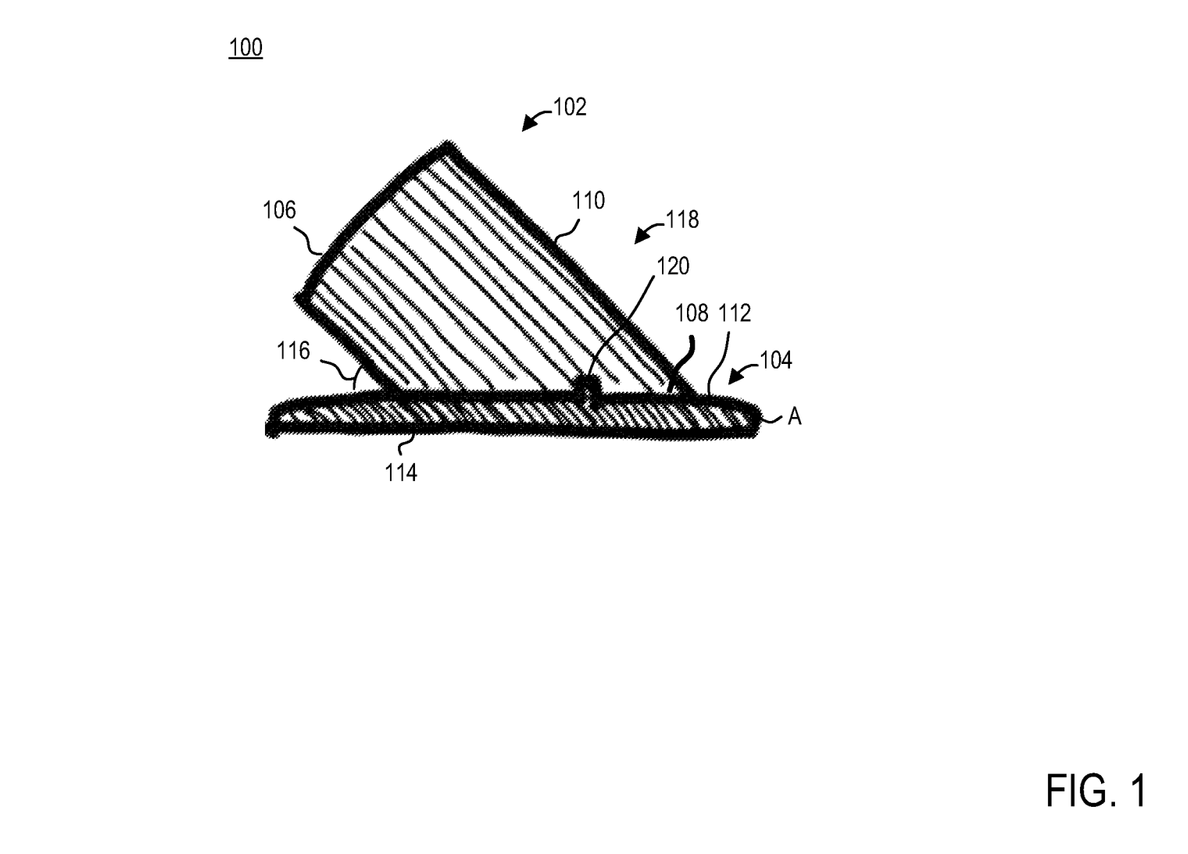
FIG. 1 is a block diagram illustrating a side perspective view of apparatus, according to example embodiments.

FIG. 1 is a block diagram illustrating a side perspective view of apparatus 100, according to example embodiments. As illustrated, apparatus 100 may include at least a first portion 102 and a second portion 104. First portion 102 may include a first end 106, a second end 108, and a body 110 extending between first end 106 and second end 108. In some embodiments, body 110 may be substantially cylindrical in shape.

Second portion 104 may include a body 110 having a top surface 112 and a bottom surface 114. In some embodiments, top surface 112 may be substantially parallel with bottom surface 114.

As illustrated, second end 108 of first portion 102 may be coupled with top surface 112 of second portion 104. In some embodiments, first portion 102 may be integral with second portion 104, thus forming a single continuous body 118. For example, apparatus 100 may be three-dimensionally printed as a single unitary apparatus. In another example, apparatus 100 may be formed as a single unitary apparatus using various molding and/or extruding techniques. Generally, first portion 102 may be coupled with top surface 112, such that an angle 116 is formed therebetween. In some embodiments, angle 116 may be approximately 45°.

Figure 2:
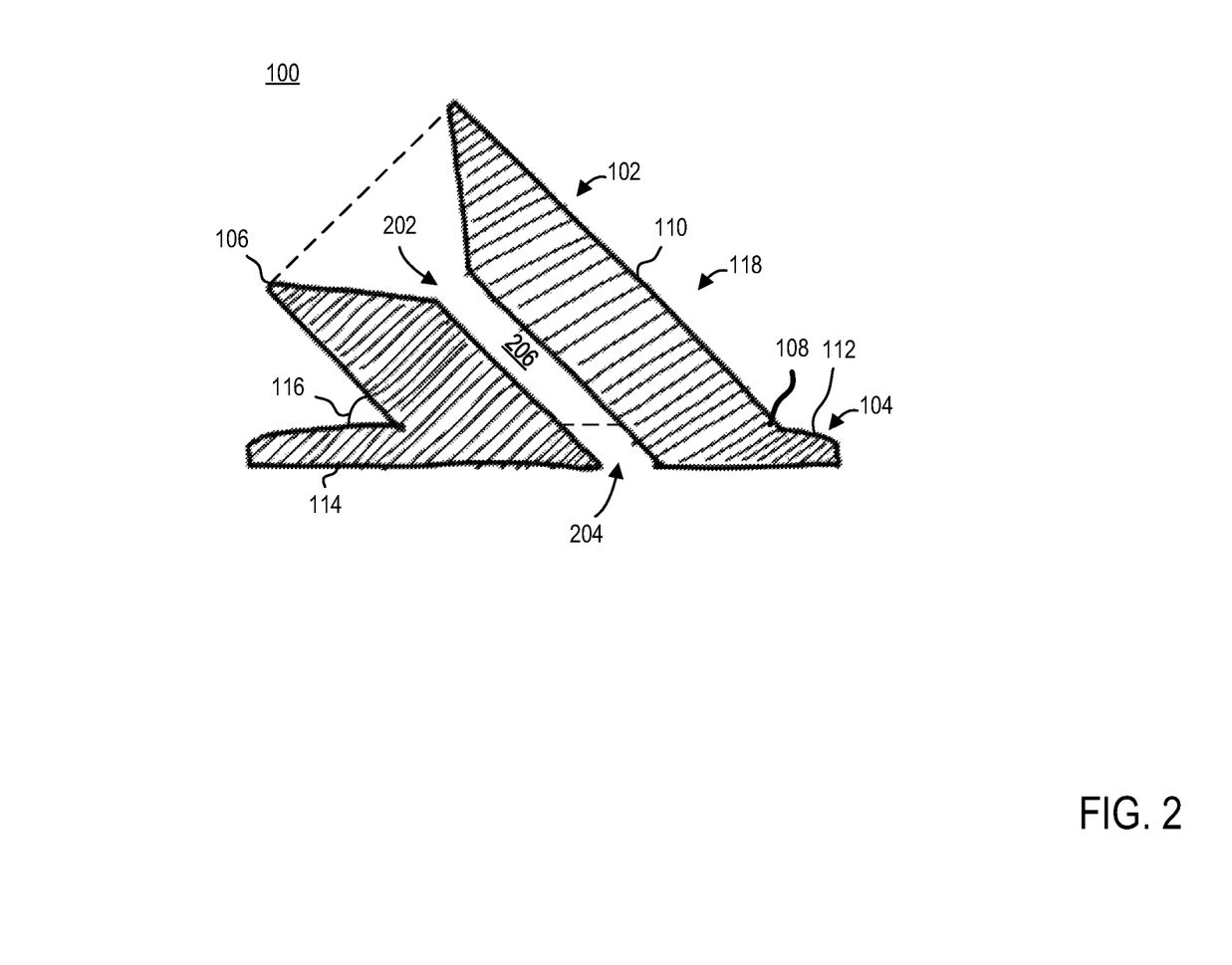
FIG. 2 is a block diagram illustrating a cross-sectional view of the apparatus of FIG. 1, according to example embodiments.

In some embodiments, apparatus 100 may be formed from a plastic material. For example, apparatus 100 may be formed from a plastic material that is safe for contact with skin. Generally, apparatus 100 may be formed from any material, as long as that material may be safe for contact with skin. FIG. 2 is a block diagram illustrating a cross-sectional view of apparatus 100, according to example embodiments. As illustrated, first portion 102 may include opening 202 formed therethrough. In some embodiments, opening 202 may extend from first end 106 to second end 108. Second portion 104 may include opening 204 formed therethrough. In some embodiments, opening 204 may extend from top surface 112 to bottom surface 114. Generally, first portion 102 may be coupled with second portion 104, such that opening 202 and opening 204 are in fluid communication and that angle 116 may be formed between first portion 102 and second portion 104. In other words, opening 202 and opening 204 may form an uninterrupted opening 206 through apparatus 100.

In some embodiments, opening 202 may be sized to receive catheters ranging from about 2.0 mm in diameters to about 9.0 mm in diameter. For example, opening 202 may have a diameter of at least 2.0 mm. Generally, opening 202 may have a maximum diameter. For example, diameter of opening 202 may be sized, such that a catheter, when placed in opening 202, cannot stray from the path defined by opening 202. In some embodiments, diameter of opening 202 may be variable. For example, diameter of opening 202 may taper (e.g., gradually decrease) from first end 106 to second end 108.

In some embodiments, opening 204 may be sized to receive catheters ranging from about 2.0 mm in diameters to about 9.0 mm in diameter. For example, opening 204 may have a diameter of at least 2.0 mm. Generally, opening 204 may have a maximum diameter. For example, diameter of opening 202 may be sized, such that a catheter, when placed in opening 202, cannot stray from the path defined by opening 204.

In some embodiments, opening 202 and opening 204 may include the same diameter. In some embodiments, opening 202 and opening 204 have diameters, such that a diameter of uninterrupted opening 206 tapers from first end 106 to bottom surface 114.

Figure 3:
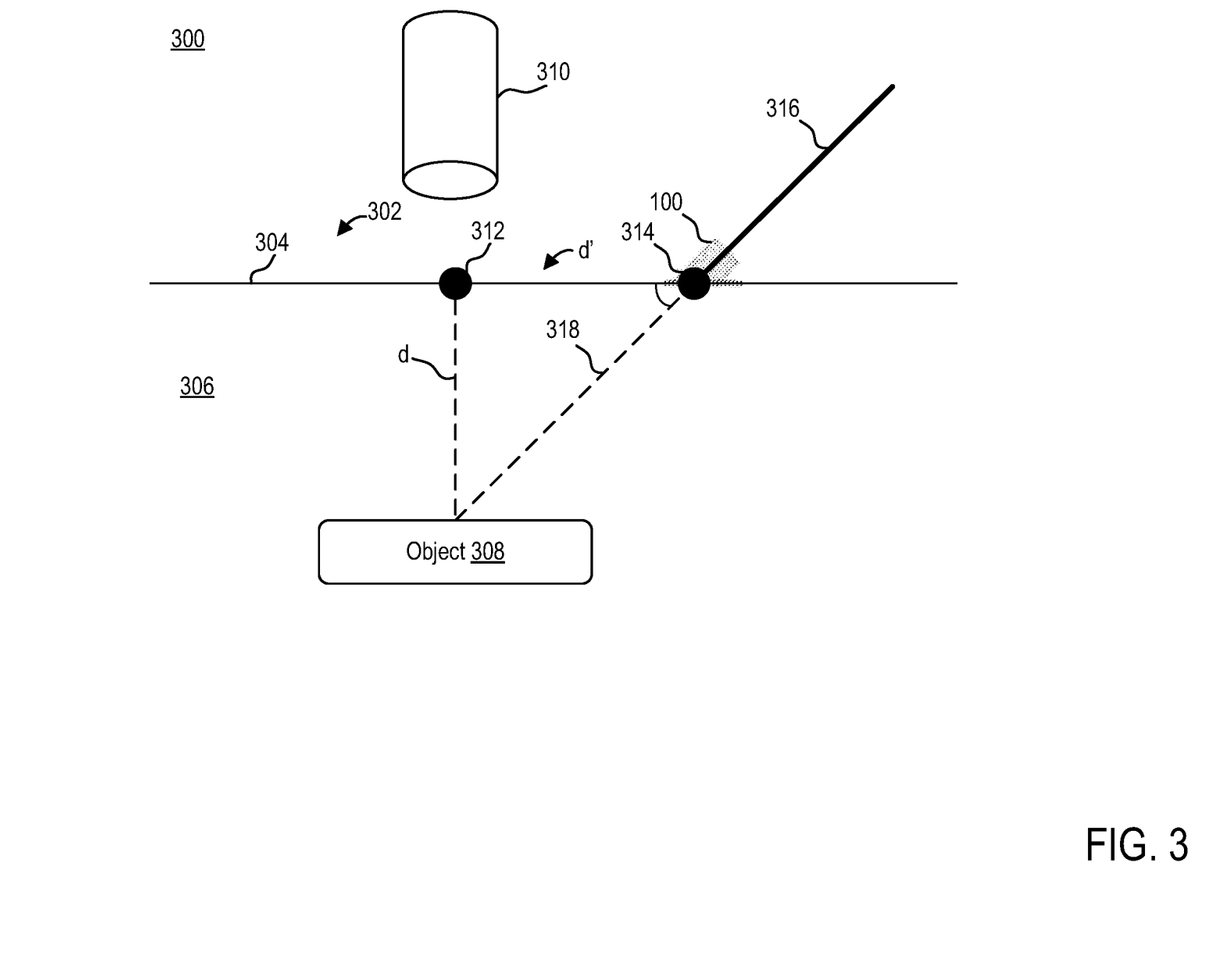
FIG. 3 illustrates an exemplary diagram of using the apparatus of FIG. 1 for inserting a catheter, according to example embodiments.

FIG. 3 illustrates an exemplary diagram 300 of using apparatus 100 for inserting a catheter, according to example embodiments. As shown, diagram 300 may include a portion of a patient's body (e.g., body 302). Body 302 may include a surface 304 and an interior 306. Interior 306 of body 302 may include a target 308. In some embodiments, target 308 may be representative of vein.

A user may utilize an imaging device 310 to locate target 308 in body 302. In some embodiments, imaging device 310 may be an ultrasound imaging device. By using imaging device 310, a user may be able determine the location and/or depth of target 308 in body 302. Using this information, a user may determine a location 312 on surface 304 that is directly above target 308. Further, the user may determine a depth ("d") of target 308 in body 302.

Using the depth of target 308, a user may identify an insertion point 314 on surface 304. In some embodiments, a distance, d', between location 312 and insertion point 314 may be substantially equal to depth, d, of target 308. By identifying insertion point 314 having a distance d'=d, the user now has two sides of a right triangle. Further, by using apparatus 100, the user may ensure that catheter 316 is inserted at insertion point 314 at a specified angle (e.g., 45°). This insertion may create a path 318 from insertion point 314 directly to target 308.

In some embodiments, to aid in identifying a right angle between location 312 and target 308, a user may position imaging device 310 on a skin or surface of the individual, such that imaging device 310 lays flat.

Recall, conventional approaches to placing a catheter involve a user (or another user) to continually monitor the progress of the catheter as it enters the patient's body to ensure that the catheter is on the correct path towards a target in the patient's body. Often times, this results in a user having to guess and check the location of the catheter during its path to a target. The above approach using apparatus 100 eliminates the need for this continual monitoring. Imaging only needs to be performed in the initial stages to identify a location and depth of target 308. This allows the user to use both hands in inserting catheter 316. Further, should a user want to check the trajectory of the catheter, apparatus 100 aids in ensuring that the catheter will pass at least through a field of view of imaging device 310, eliminating any need for the user to guess a current location of the catheter.

Referring back to FIG. 1, apparatus 100 may further include one or more elements 120. Each element 120 may be formed on top surface 112 of second portion 104. Element 120 may represent a pre-specified distance from an end of second portion 104. For example, as illustrated, each element 120 may be formed on top surface 112 about one centimeter from end A of second portion 104. In this manner, apparatus 100 may be used to measure a distance d' from location 312. In some embodiments, each element 120 may be positioned on top surface 112 such that it aligns with second opening 204.

Figure 4:
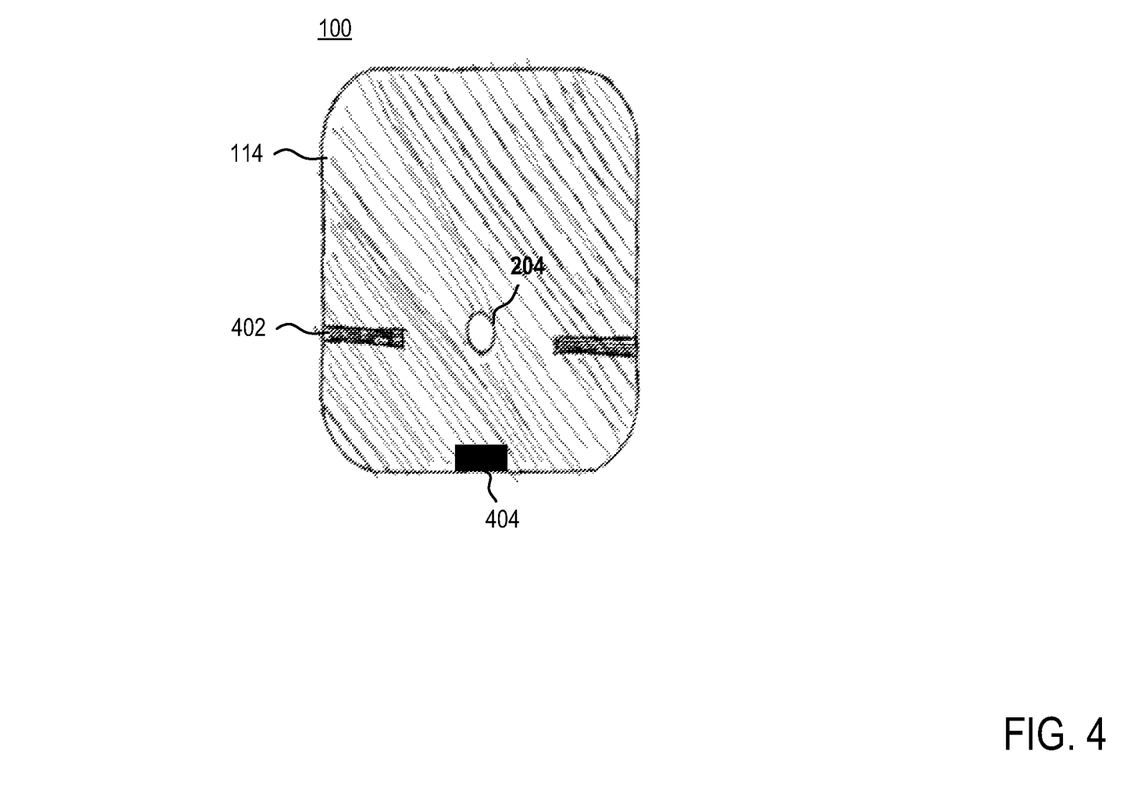
FIG. 4 is a block diagram illustrating a bottom perspective view of the apparatus of FIG. 1, according to example embodiments.

FIG. 4 is a block diagram illustrating a bottom perspective view of apparatus 100, according to example embodiments. As illustrated, opening 204 extends to bottom surface 114. In some embodiments, bottom surface 114 may include a marking component 402. Marking component 402 may be representative of a component configured to make a visible mark on a patient's body. For example, a user may implement marking component 402 to make a mark at location 312 and/or insertion point 314 on patient's body 302. In some embodiments, marking component 402 may be representative of a permanent marker, highlighter, pen, marker, and the like. In this manner, an individual may create a starting point mark on a patient's body.

In some embodiments, bottom surface 114 may father include a measuring component 404. Measuring component 404 may be representative of a measuring tape that can be folded up and stored within a part of second portion 104.

Figure 5:
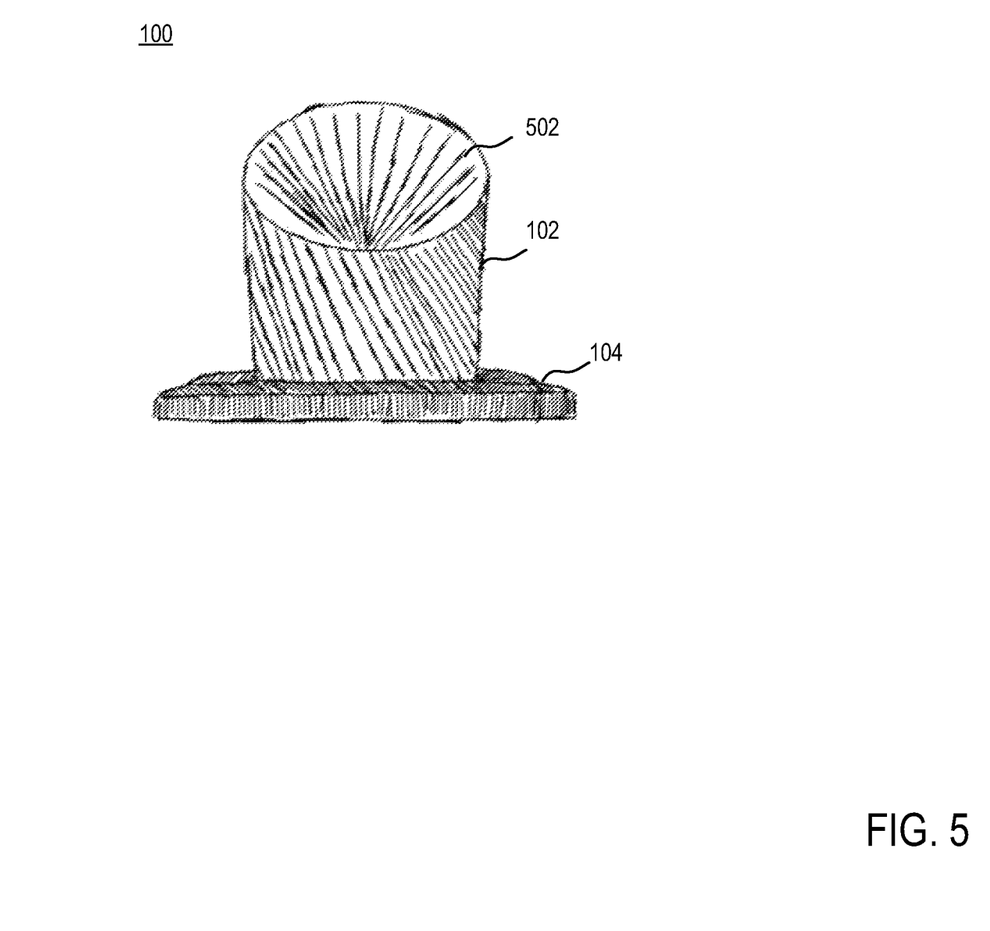
FIG. 5 is a perspective view of the apparatus of FIG. 1, according to example embodiments.

FIG. 5 is a perspective view of apparatus 100, according to example embodiments. As shown, first end 106 or first portion 102 may include side walls 502. Side walls 502 may be sloped from first end 106 towards opening 202. Sloping side walls 502 towards opening 202 may aid users in guiding the catheter towards opening 202.

Figure 6:
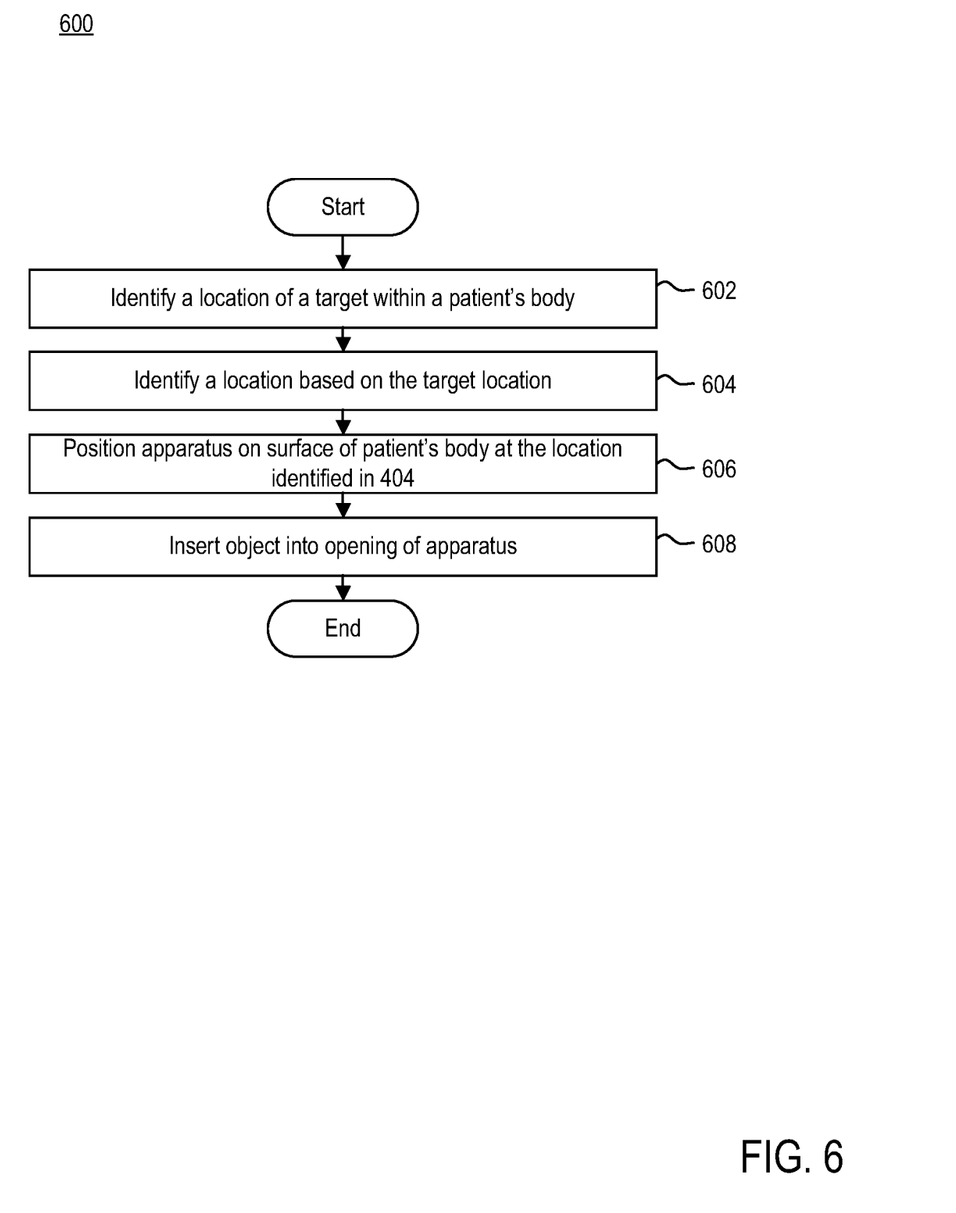
FIG. 6 is a flow diagram illustrating a method of placing a catheter in a patient, according to example embodiments.

FIG. 6 is a flow diagram illustrating a method 600 of placing a catheter in a patient, according to example embodiments. Method 600 may begin at step 602.

At step 602, a user may identify a location of a target within a body of a patient. For example, the user may utilize various imaging techniques (e.g., ultrasound imaging) to identify the target within the patient's body. In some embodiments, identifying the location of the target may include identifying a depth (d) of the target from a second location on surface of the patient's body (e.g., skin).

At step 604, the user may identify a third location based on the location of the target and the second location on the surface of the patient's body. For example, the third location may be a distance (d') from the second location, such that d'=d. In other words, the distance from the second location to the target is approximately equal to the distance from the second location to the third location.

At step 606, the user may position apparatus 100 on the surface of the patient's body at the third location. For example, the user may position apparatus 100 at the third location, such that opening 204 is positioned at the third location.

At step 608, the user may insert an object into opening 202 of apparatus 100. For example, the user may insert the catheter into opening 202 when apparatus 100 is correctly positioned on the patient's body. In this manner, apparatus 100 may ensure that the object enters the patient's body at a pre-specified angle (e.g., 45°).

Figure 7:
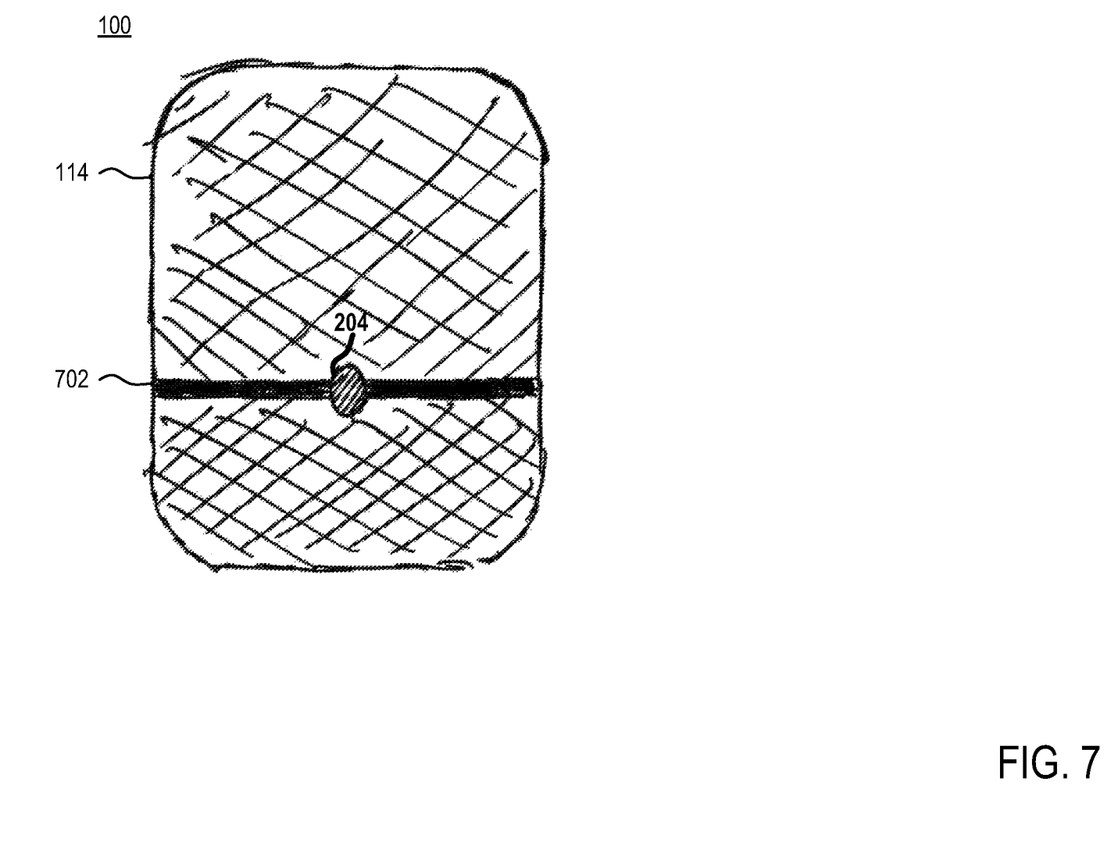
FIG. 7 is a block diagram illustrating a bottom view of apparatus, according to example embodiments.

FIG. 7 is a block diagram illustrating a bottom view of apparatus 100, according to example embodiments. As shown, in some embodiments, bottom surface 114 may include a sterile marking element 702. Sterile marking element 702 may allow an administrator or user of apparatus 100 to mark a line on the skin of a patient. In this manner, an administrator or user can denote a distance to the target. For example, a user may implement sterile marking element 702 to make a mark at location 312 and/or insertion point 314 on patient's body 302.

While the foregoing is directed to embodiments described herein, other and further embodiments may be devised without departing from the basic scope thereof. It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. An apparatus, comprising:
a first portion having a cylindrical body, the cylindrical body comprising a first opening formed therethrough, the first opening configured to receive a catheter; and
a second portion having a body comprising a top surface and a bottom surface, the top surface substantially parallel to the bottom surface, the bottom surface configured to contact a skin of a patient, wherein the body comprises a second opening formed therethrough, the second portion coupled with the first portion such that a forty-five degree angle is formed therebetween and wherein the first opening and the second opening form an uninterrupted opening through the apparatus, wherein the second portion further comprises:
a first measuring element and a second measuring element formed on the top surface of the body, the first measuring element formed on a first side of the second opening at a predetermined distance from a first end of the body, the second measuring element formed on a second side of the second opening at the predetermined distance from the first end of the body, wherein the first measuring element and the second measuring element are aligned with the second opening; and
a first marking component and a second marking component formed on the bottom surface of the body, the first marking component formed on the first side of the second opening at the predetermined distance from the first end of the body, the second marking component formed on the second side of the second opening at the predetermined distance from the first end of the body, wherein the first marking component and the second marking component are aligned with the second opening, the first marking component configured to generate a first visible mark on the body of the patient at a first location corresponding to the first measuring element, the second marking component configured to generate a second visible mark on the body of the patient at a second location corresponding to the second measuring element.

2. The apparatus of claim 1, wherein the second portion comprises:
a measuring tape stored therein, wherein the measuring tape is expandable.

3. The apparatus of claim 1, wherein the first portion and the second portion form a unitary body.

4. The apparatus of claim 3, wherein the uninterrupted opening is formed through the unitary body.

5. The apparatus of claim 1, wherein the forty-five degree angle is formed between a centerline of the first opening and the top surface of the second portion.

6. The apparatus of claim 1, wherein the cylindrical body includes a first end and a second end, and wherein the first end slopes towards the first opening.

7. A method of inserting a catheter, comprising:
identifying a first location of a target area within a patient's body;
identifying a second location on a surface of the patient's body based on the first location, the first location substantially perpendicular with the second location, wherein a first distance between the first location and the second location defines a depth of the target area from the surface of the patient's body;
identifying a third location on the surface of the patient's body substantially in-line with the second location, wherein a second distance from the third location to the second location is equal to the first distance from the first location to the second location;

positioning the apparatus of claim 1 on the surface of the patient's body at the second location; and inserting a catheter into the first opening of the apparatus, wherein the catheter enters the patient's body at a forty-five degree angle at the second location.

8. The method of claim 7, further comprising:

measuring the second distance from the third location using the apparatus.

9. An apparatus, comprising:

a first portion having a cylindrical body, the cylindrical body comprising a first opening formed therethrough, the first opening configured to receive a catheter; and a second portion having a body comprising a second opening formed therethrough, wherein the second portion is coupled with the first portion such that a forty-five degree angle is formed therebetween and wherein the first opening and the second opening are in fluid communication, wherein the second portion further comprises:

a first measuring element and a second measuring element formed on a first surface of the body, the first measuring element and the second measuring element having top surfaces that extend above a top surface of the body of the second portion, the first measuring element formed on a first side of the second opening at a predetermined distance from a first end of the body, the second measuring element formed on a second side of the second opening at the predetermined distance from the first end of the body, wherein the first measuring element and the second measuring element are aligned with the second opening; and     a first marking component and a second marking component formed on a second surface of the body, opposite the first surface, the first marking component formed on the first side of the second opening at the predetermined distance from the first end of the body, the second marking component formed on the second side of the second opening at the predetermined distance from the first end of the body, wherein the first marking component and the second marking component are aligned with the second opening, wherein at least one of the first marking component is configured to generate a first visible mark on a body of a patient at a first location corresponding to the first measuring element or the second marking component is configured to generate a second visible mark on the body of the patient at a second location corresponding to the second measuring element.

10. The apparatus of claim 9, wherein the second portion comprises:

a measuring tape stored therein, wherein the measuring tape is expandable.

11. The apparatus of claim 9, wherein the first portion and the second portion form a unitary body.

12. The apparatus of claim 11, wherein the first opening and the second opening form an uninterrupted opening through the unitary body.

13. The apparatus of claim 9, wherein the forty-five degree angle is formed between a centerline of the first opening and the second portion.

14. The apparatus of claim 9, wherein the cylindrical body includes a first end and a second end, and wherein the first end slopes towards the first opening.

\* \* \* \* \*